July 20, 1926.  A. W. MORSE  1,592,988
VALVE
Filed Sept. 6, 1922
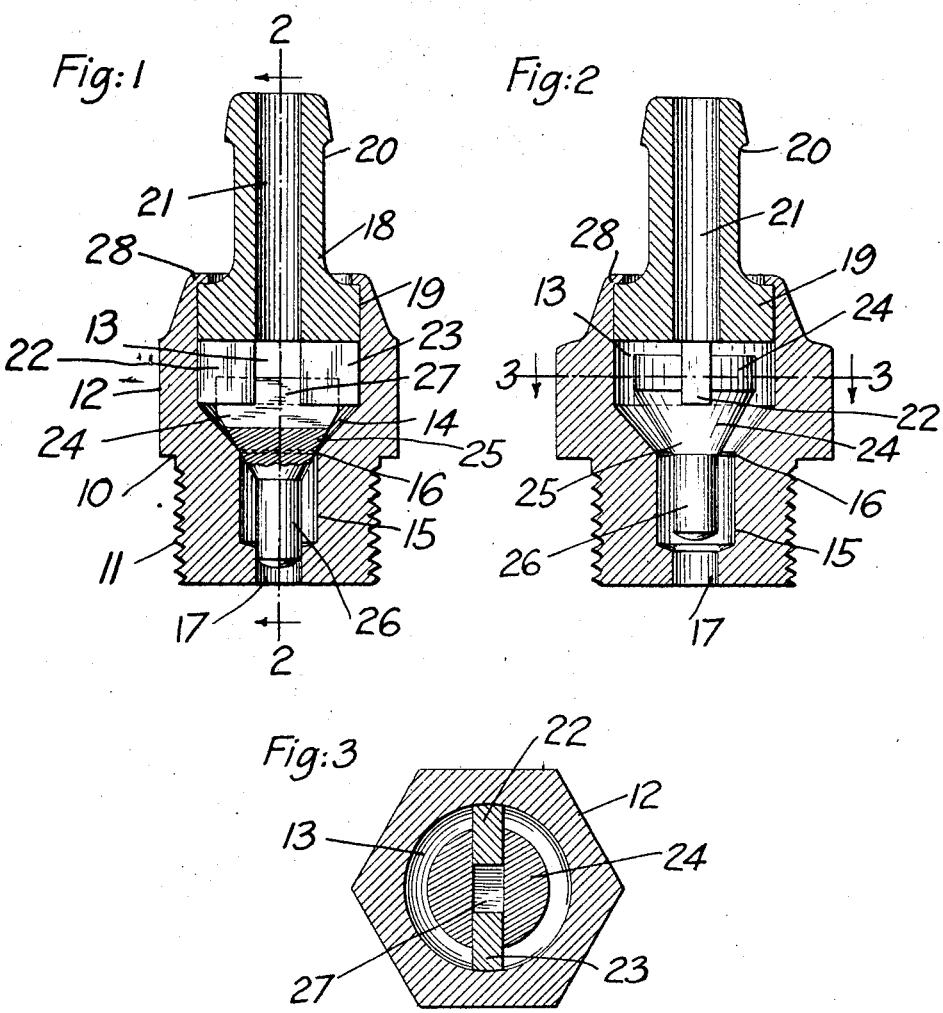
Albert W. Morse
INVENTOR.
BY *[signature]*
ATTORNEY.

Patented July 20, 1926.

1,592,983

UNITED STATES PATENT OFFICE.

ALBERT W. MORSE, OF LONG ISLAND CITY, NEW YORK.

VALVE.

Application filed September 6, 1922. Serial No. 586,489.

This invention relates to new and useful improvements in valves and particularly in valves, the construction of which and process of fitting, are set forth in Letters Patent No. 1,006,852 issued October 24, 1911, to Edgar A. Kelsey.

It has been found that valves made tight by reversely producing the minute imperfections in the seating surfaces of valves and their seats are of great commercial importance because of their simplicity of design, reliability of service, and high operating efficiency. By referring to the specification of the above mentioned Letters Patent, it will be seen that such valves are set in position on seats of valve bodies and are provided with means to guide them to this exact position at the end of each operating cycle, and are then pressed into this position so that every projection in the seating face of valves makes a corresponding depression in the valve seats of valve bodies, and vice versa.

The efficiency of these valves depends chiefly upon the construction employed to guide the valves proper to the exact position on seats into which they have previously been pressed. The minute projections must fall into corresponding depressions at each seating. The slightest turning or shifting out of this original impressed position must be avoided. If this is permitted to occur, both projections and depressions become obstacles which prevent seating and cause leakage.

It is the particular purpose of this invention, to provide means for accurately guiding valve discs into fitted position in a simple and efficient manner and to embody the same in a valve of sturdy and reliable construction.

It is another object of the invention to eliminate expensive screwthreading operation by performing the assembly of the valve by pressing together or crimping its component parts.

The invention is illustrated in the accompanying drawing which shows a preferred embodiment of the invention in the form of a valve used as check valve of tire pumps, and in which—

Fig. 1 is a longitudinal sectional views of the valve, in closed or normal position;

Fig. 2 is a longitudinal sectional view along the plane of line 2—2 in Fig. 1, and showing the valve in an open position; and Fig. 3 is a cross sectional view along the plane of line 3—3 in Fig. 2.

Like characters of reference denote similar parts throughout the several views and the following specification.

10 is a valve casing, having an end threaded exteriorly at 11. 12 is a center section of casing 10, polygonal in shape, to facilitate gripping the casing 10 to screw its threaded end 11 into a desired place of application. 13 is a central bore through casing 10, reduced by a chamfer 14 to a smaller diameter at 15, the intersection between surfaces 14 and 15 being slightly beveled, forming a valve seat 16. Bore 15 is still further reduced at its extreme lower end to form an inlet passage 17.

18 is an outlet member having a central portion 19 of a diameter to snugly fit bore 13 of casing 10. 20 is an end of outlet member 18, of reduced diameter and adapted to fit within a suitable flexible pipe. 21 is a central bore through outlet member 18 forming an outlet passage. Below the central portion 19 of member 18, and at both sides of bore 21 are two flat lugs 22 and 23. Lugs 22 and 23 contact with that inner part of casing 10 which is formed by the intersection of bore 13 with chamfer 14.

24 is a valve having a lower tapering portion 25 adapted to seat against valve seat 16. Valve 24 is further provided with an extension 26, below its tapering portion 25, its lowest end adapted to slidingly engage the inlet passage 17. Across its upper face, valve 24 is slotted at 27 to slidably engage lugs 22 and 23 of outlet member 18.

The process of assembling the valve is as follows:

The valve 24 is placed in the casing 10. Outlet member 18 is then placed over the valve, its lugs 22 and 23 within the slot 27 and contacting with the lower part of the center bore 13 of the casing. A press with suitable dies then performs a crimping operation, that is, forces an end 28 of the casing slightly over the upper portion of part 19 of the outlet member. Simultaneously a pin in the press is inserted through the outlet 21 and taps the valve 24 in order to reversely reproduce in the face of tapered portion 25 of valve 24 and valve seat 16 of the casing the minute imperfections.

In actual operation, fluid or air, under pressure, is introduced below the valve 24 through inlet passage 17. The valve 24 is then lifted from its seat, the lower end of extension 26 uncovers the inlet passage and the liquid or air is discharged through bore 15, past the valve seat and around the valve 24 through outlet bore 21.

Attention is particularly directed to the fact that the distance between the lower ends of lugs 22 and 23 and the bottom of slot 27 is less than the clearance between the upper face of valve 24 and part 19 of outlet member 18, so as to allow the liquid or air to pass around the valve to the outlet opening. Furthermore, it is a very important feature of the invention that the lower end of extension 26 be snugly guided in the inlet bore when the valve is closed. This acts as a supplemental guide in aiding the valve to seat in the same position in every instance. This amount of guiding surface must obviously be less than the lift of the valve, so as to uncover the inlet passage.

It is obvious that the construction may be varied to suit many other purposes, and it should be understood that various changes of form, proportion and minor details may be resorted to without departing from the principle or sacrificing any of the advantages of the invention as defined in the appended claims.

What I claim as new, is:

1. In a valve structure, a valve casing, having an inlet passage, and an outlet member fastened non-rotatably together by crimpage, the said outlet member having means to fix its position within the said casing, a valve, and a valve seat, said valve being provided with an extension below its seat slidably engaging a reduced portion of the said inlet passage of the valve casing, the said extension being of a length to entirely clear the said reduced portion when the valve is opened fully.

2. In a device of the kind described, a valve casing, having an inlet passage, and an outlet member fastened together by crimpage, the said outlet member having lugs projecting within the said casing to fix the position of the inlet member within the casing, a valve, and a valve seat, said valve being provided with guiding means above its seat non-rotatably engaging a reduced portion of the said outlet member, and with an extension below its seat slidably engaging the said inlet passage of the valve casing, the said extension being of a length to entirely clear the said reduced portion when the valve is opened fully.

3. In a device of the character described, a valve casing, having an inlet passage, and outlet member fastened together by crimpage, a valve, and a valve seat, the said outlet member having lugs and the said valve having an open slot for the reception of the said lugs, the said lugs also contacting with the said valve casing to fix the position of the said outlet member within the said casing, and the said valve, and having an extension below its seat slidably engaging a reduced portion of the said inlet passage of the valve casing, the said extension being of a length to entirely clear the said reduced portion when the valve is opened fully.

In testimony whereof I have hereunto set my hand.

ALBERT W. MORSE.